US008107017B2

(12) United States Patent
Slobodin et al.

(10) Patent No.: US 8,107,017 B2
(45) Date of Patent: Jan. 31, 2012

(54) COMBINATION DISPLAY APPARATUS

(75) Inventors: David Elliott Slobodin, Lake Oswego, OR (US); Ross Kruse, Salem, OR (US)

(73) Assignee: Seiko Epson Corporation, Tokyo (JP)

( * ) Notice: Subject to any disclaimer, the term of this patent is extended or adjusted under 35 U.S.C. 154(b) by 1373 days.

(21) Appl. No.: 11/701,166

(22) Filed: Jan. 31, 2007

(65) Prior Publication Data
US 2008/0180581 A1    Jul. 31, 2008

(51) Int. Cl.
*H04N 5/64*   (2006.01)
*H04N 9/31*   (2006.01)

(52) U.S. Cl. ........ 348/744; 348/789; 348/212; 348/213; 348/556; 348/569; 353/72; 353/79; 353/69; 353/94; 353/121; 353/30; 341/22; 345/32; 345/732

(58) Field of Classification Search .................. 348/744, 348/789, 212, 213, 556, 569; 353/72, 79, 353/69, 94, 121, 30; 341/22; 345/32, 732
See application file for complete search history.

(56) References Cited

U.S. PATENT DOCUMENTS

| | | | | |
|---|---|---|---|---|
| 6,141,151 | A * | 10/2000 | Shimonura et al. | 359/618 |
| 6,172,814 | B1 * | 1/2001 | Watanabe et al. | 359/619 |
| 6,179,426 | B1 * | 1/2001 | Rodriguez et al. | 353/69 |
| 7,018,043 | B2 * | 3/2006 | Castaldi et al. | 353/30 |
| 7,180,475 | B2 * | 2/2007 | Slobodin et al. | 345/2.3 |
| 2002/0036652 | A1 * | 3/2002 | Masumoto et al. | 345/732 |
| 2002/0151283 | A1 * | 10/2002 | Pallakoff | 455/90 |
| 2002/0196378 | A1 * | 12/2002 | Slobodin et al. | 348/744 |
| 2003/0164780 | A1 * | 9/2003 | Liu | 341/22 |
| 2005/0134528 | A1 * | 6/2005 | Valliath et al. | 345/32 |
| 2005/0152031 | A1 * | 7/2005 | Umeya | 359/449 |
| 2005/0185051 | A1 * | 8/2005 | Perlin | 348/51 |
| 2007/0052851 | A1 * | 3/2007 | Ochs et al. | 348/556 |
| 2007/0276239 | A1 * | 11/2007 | Rafter | 600/437 |
| 2008/0094383 | A1 * | 4/2008 | Stessen et al. | 345/209 |

* cited by examiner

*Primary Examiner* — Jefferey Harold
*Assistant Examiner* — Mustafizur Rahman
(74) *Attorney, Agent, or Firm* — Kilpatrick Townsend & Stockton LLP

(57) ABSTRACT

A combination display is provided. The combination display includes a front projector and a direct-view screen having a shared video processing system.

11 Claims, 3 Drawing Sheets

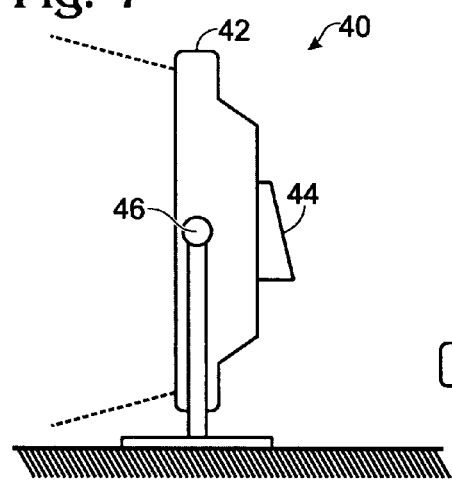
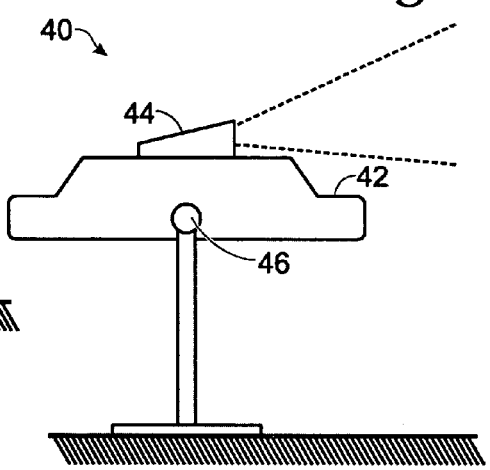
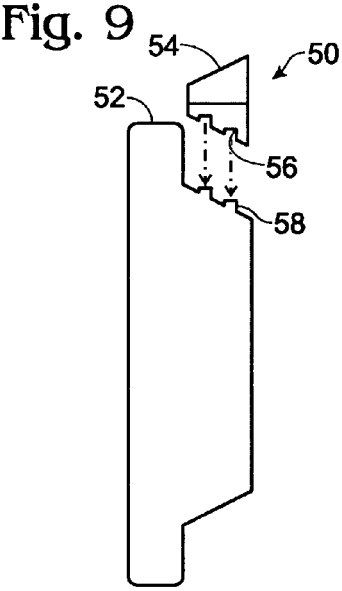
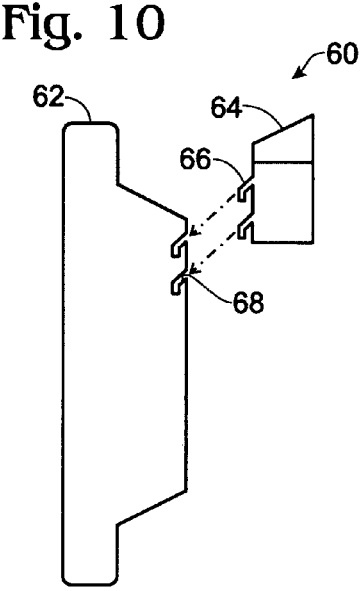

COMBINATION DISPLAY APPARATUS

BACKGROUND

A front projection display device may provide highly detailed video imagery on a large viewable scale. Furthermore, by using a front projection display device to watch video content, an audience can achieve a viewing experience similar to that of a movie theatre in their own home due to the large scale of the display. Accordingly, a front projection display device may be desirable for use in a household setting, such as for example, as part of a home theatre system.

However, the inventor herein has recognized that a front projection display device may not always be the preferred device used to watch video content in a household setting. For example, in high ambient light conditions video imagery projected from a front projection display device can appear washed out. Furthermore, users may find it undesirable to watch all video content on a large format. Also, it may be difficult to find a convenient and aesthetically pleasing location to place the projection device. Accordingly, a direct-view display television may also be desirable for use in the same household setting to watch video content on a smaller scale or during the daytime, among other reasons.

However, having a separate projection device and direct-view television in the same setting may be impractical and undesirable due to increased costs associated with purchasing both devices. Additionally, spatial limitations may present a further concern. Namely, a room may not have enough space to conveniently place a direct-view display television and front projection display and associated projection screen.

BRIEF DESCRIPTION OF THE DRAWINGS

FIG. 7 shows another exemplary embodiment of the combination display apparatus operating in a direct-view mode and having a first orientation.

FIG. 8 shows the combination display apparatus of FIG. 6 operating in a projection mode and having a second orientation.

FIG. 9 shows another exemplary embodiment of the combination display apparatus.

FIG. 10 shows another exemplary embodiment of the combination display apparatus.

WRITTEN DESCRIPTION

Figure 1:
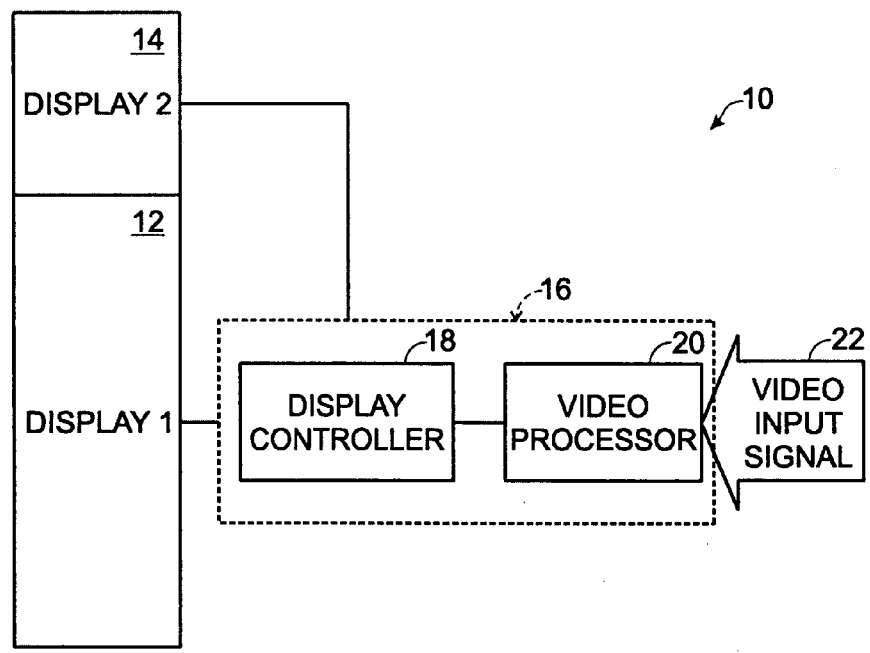
FIG. 1 schematically shows an exemplary embodiment of the combination display apparatus of the present disclosure.

FIG. 1 schematically depicts an exemplary embodiment of a combination display apparatus 10. Combination display apparatus 10 may include two displays for presenting video imagery on different viewable scales according to a viewer's preference. First display 12 may present video imagery on a smaller scale such as for viewing in close proximity to combination display apparatus 10.

For example, the first display may include a direct-view display wherein video imagery may be shown directly on a screen to an audience. The direct-view display may vary in screen size and aspect ratio. For example, the direct-view display may have an aspect ratio of 4:3, 16:9, or any other suitable format. The direct-view display may be configured for viewing video content, in some cases with great detail, and thus the direct view display may be adequately sized for such purposes. In some embodiments, the direct-view display may be at least 30 inches in diameter (measured diagonally across the screen), with some examples being as large as 40, 50, 60, 70 inches or more in size. Some exemplary direct-view display types may include rear projection, flat panel, and cathode ray tube (CRT). Furthermore, an exemplary flat panel display may include a liquid crystal display (LCD), organic light emitting diode (OLED) display, a plasma screen, etc.

Combination display apparatus 10 further may include a second display 14 for presenting video imagery on a larger scale such as for viewing at a distance from the combination display apparatus. The second display may include a front projector for projecting video imagery a distance onto a projection screen. The front projector may include a light source to illuminate the projected image, such as for example, a metal halide lamp. In addition, the front projector may employ a variety of lenses to modify an image in order to project it onto a surface. For example, a front projector may include a short throw projection lens which may project video imagery at a steep angle in order to reduce the distance between the projection device and the projection screen.

Furthermore, the second display may project a video image onto any suitable projection screen. For example, the second display may project a video image onto a rigid wall-mounted screen. The rigidity of such a screen may help limit deformations in a displayed image. As another example, the second display may project a video image onto a pull-down screen. The pull-down screen may be beneficial for multipurpose spaces since the screen may be rolled up or otherwise stored when not in use. As yet another example, the wall of a room may be treated with a substance that reflects light with minimal distortion such that the second display may project a video image directly onto the treated wall. It should be understood that a variety of different projection surfaces can be used without departing from the scope of this disclosure.

Note that a projection device (e.g. front or rear projection) may employ various different technologies to display video imagery including, for example, liquid crystal display (LCD), digital light processing (DLP), liquid crystal on Silicon (LCoS), etc.

In some embodiments, in addition to two or more primary displays (e.g., the direct-view display and the presentation display), a combination display apparatus can include a small status/information display used to control device settings and/or provide information other than the video content presented by one or more of the primary displays. A small status/information display is not considered to be a direct-view display within the spirit of this disclosure. Whereas a direct-view display is sized for viewing from a normal viewing distance, the small information/status display is designed to be unobtrusive and to be used by a presenter that is working very close to the combination display apparatus.

Combination display apparatus 10 may further include video controller 16 to manage video operation of the combination display apparatus. The video controller may be configured to receive video input signal 22. Video input signal 22 may be input to video controller 16 from a variety of different content sources in a variety of different digital or analog formats. Nonlimiting examples of content sources includes media players (e.g., DVD, DVR, VCR, V-CD, etc.), over-the-air broadcasts, satellite broadcasts, cable broadcasts, and computer network broadcasts, podcasts, and streams (e.g., over a WAN, LAN, PAN, and/or MAN). A nonlimiting list of content-source formats includes MPEG-1, MPEG-2, MPEG-4, and DivX.

Note that the combination display apparatus may be configured to receive a plurality of different video input signals from different sources. Further, the combination display apparatus may selectively display one or more of the video input signals on either of the displays individually, or on both displays simultaneously. Furthermore, in some embodiments, the combination display apparatus can present video images from one content source on one display while simultaneously presenting video images from another content source on the other display.

Video controller 16 may include video processor 20 to decode video input signal 22 and display controller 18 to direct the decoded video signal to at least first display 12 or second display 14.

Once modified by video processor 20, a video signal may be directed by display controller 18 for presentation on a display. The display controller may include processing circuitry to further process the video signal for compatibility with either first display 12 or second display 14 (e.g., deliver a video signal at 480i, 480p, 720i, 720p, 1080i, 1080p, or another format corresponding to the targeted display). The video output signal may also be delivered with scaling adapted for the particular display. Further, the video signal processing may be performed such that the video signal for each display may be processed differently to match the output characteristics of each display. An exemplary display controller may be configured to modify the presentation characteristics of the first and second displays. For example, adjustable presentation characteristics may include brightness, color contrast, tint, sharpness, etc.

Furthermore, in some embodiments the display controller may be configured to modify different projection characteristics for the second display including lens shift, zoom, focus, keystone correction, and other suitable display adjustment parameters. Note that these projection adjustments may be manually controlled via various knobs, switches, dials, etc., or the corrections may be automatically controlled via digital processing circuitry. These projection adjustment parameters may be used to facilitate the placement of a projected image from the combination display onto a surface with minimal distortion.

The combination display apparatus allows multiple displays to share the same processing hardware. In particular, system hardware cost may be reduced because processing for two or more displays is carried out by one set of hardware. Furthermore, due to the elimination of redundant hardware, the combination display apparatus may have a smaller footprint resulting in a flexible apparatus that may be more easily placed in a desired setting. The small size of the apparatus further may be aesthetically pleasing in a home setting. While it is within the scope of this disclosure to use the same video processing system to control both a front-projector and a direct-view screen, it should be understood that a video processing system may have one or more components specific to only one type of display.

In some embodiments, the video controller may be configured such that the display controller may first direct a video input signal to a desired display and the video input signal may be modified by the video processor according to the presentation characteristics of the designated display. Furthermore, if the display controller directs the video input signal to both the first and second displays the video processor may modify the video input signal for each display resulting in two different video output signals.

The display controller may be implemented exclusively with hardware, exclusively with software, or a combination of hardware and software. In some embodiments the display controller may be implemented as a switch that may be toggled to direct video imagery to a desired display.

In some embodiments the display controller may direct video output to a particular display according to input from a user. In particular, the combination display apparatus may be configured to receive input from a user designating a particular display to present video imagery, for example, via a remote control device or buttons disposed in the housing of the display apparatus.

Furthermore, in some embodiments video imagery may be directed to a particular display based on the format of the content. For example, a combination display apparatus may include a first display with a 4:3 aspect ratio and a second display with a 16:9 aspect ratio. The combination display apparatus may be configured to display a film presented in 16:9 aspect ratio (e.g. wide screen) on the second display since the format and the display share the same aspect ratio.

One exemplary embodiment of the combination display apparatus may be configured to direct video imagery to a particular display based on ambient light conditions. For example, the apparatus may include a light detection device for detecting the amount of ambient light. If the light detection device detects an amount of light beyond a threshold amount the combination display apparatus may present video imagery on the first display (direct-view display) since the first display may be more suitable for viewing in high ambient light conditions as discussed above. On the other hand, if the light detection device detects low ambient light conditions the combination display apparatus may present video imagery on the second display (front projection) since the second display may be better viewed in low ambient light conditions.

Figure 2:
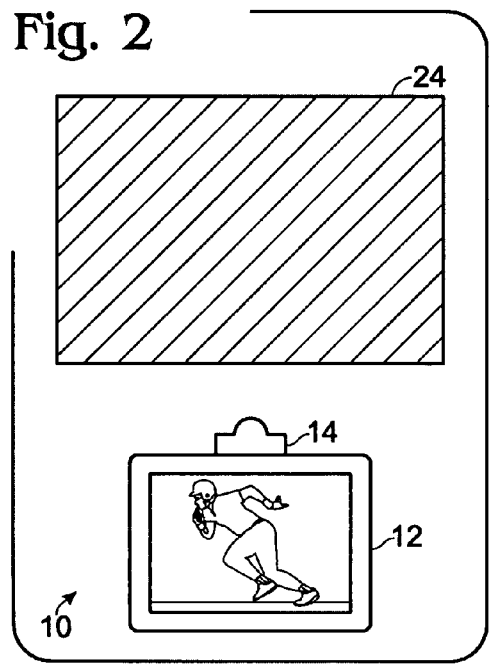
FIG. 2 shows an exemplary embodiment of the combination display apparatus operating in a direct-view mode.
Figure 3:
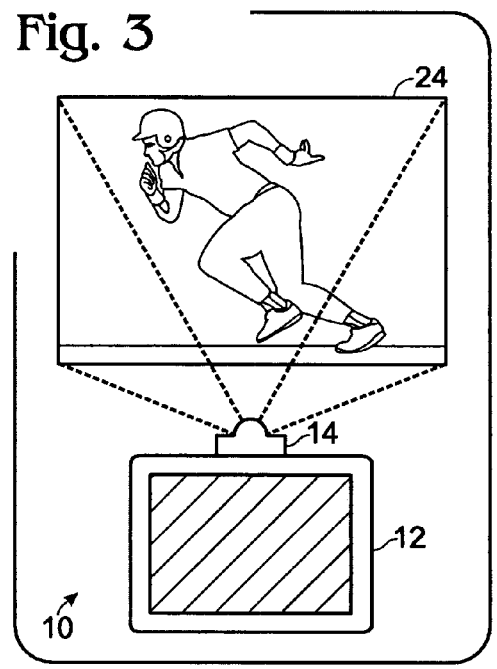
FIG. 3 shows the combination display apparatus of FIG. 2 operating in a projection mode.
Figure 4:
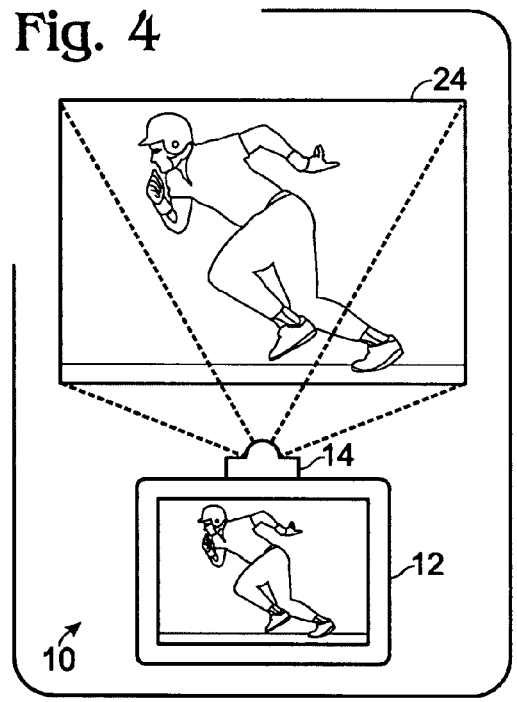
FIG. 4 shows the combination display apparatus of FIG. 2 operating in a simultaneous direct-view/projection mode.

FIGS. 2-4 show a front view of an exemplary embodiment of the combination display apparatus of the present disclosure operating in different modes. FIG. 2 shows combination display apparatus 10 operating in a first mode where only the first display presents video imagery. Specifically, first display 12 presents video imagery, and second display 14 does not project video imagery on to projection screen 24.

The viewing mode illustrated in FIG. 2 can be selected based on any number of different viewer preferences and/or device settings. The following are nonlimiting examples of selection criteria for implementing the viewing mode of FIG. 2. The combination display apparatus may operate in the first mode to display video imagery on a smaller scale. For example, the first mode may be designated when a viewer is within close proximity to the combination display apparatus. Also, the first mode may be designated for viewing content that places less emphasis on visual display. For example, television programming such as the news or talk shows may be viewed in the first modes since communicating the content of the programming is not necessarily based on visual presentation. Further, the first mode may be used in a multipurpose setting where video presentation on a large scale may detract from other simultaneously occurring events in the same setting.

FIG. 3 shows combination display apparatus 10 operating in a second mode where only the second display presents video imagery. Specifically, second display 14 projects video imagery onto projection screen 24, and first display 12 does not present video imagery. The combination display apparatus may operate in the second mode to display video imagery on a larger scale. For example, the second mode of operation may be used in a home theatre setting. The large scale of the projected video imagery may simulate the experience of viewing a movie in a theatre. Further, the second mode may be beneficial for such programs as sporting events. Due to the fast pace of sporting events, details of various actions may be missed. However, the second display may facilitate viewing even at a fast pace due to the large scale presentation. The second mode of operation further may be used for large audiences. In particular, the large scale presentation may allow for viewing of the presentation screen from a distance, thus allowing for a larger viewable area to accommodate a greater number of viewers.

FIG. 4 shows combination display apparatus 10 operating in a third mode where both the first display and the second display simultaneously present video imagery. Specifically, second display 14 projects video imagery in a first direction onto projection screen 24 and first display 12 presents video imagery in a second direction. The combination display apparatus may operate in the third mode to display video imagery on both small and large scales. The third mode may be used by an audience for viewing the two displays at varying distances and heights. For example, a first audience group may view the first display in close proximity to the combination display apparatus and a second audience group may view the second display at a distance from the combination display apparatus. As another example, a first audience group may view the first display from a first height and a second audience group may view the second display at a height above the first audience group. Furthermore, as discussed above, the second display may be adjusted via lens shift or other presentation adjustment parameters to project video imagery at different angles in order to accommodate viewing by an audience at varying heights and distances.

Note that although FIG. 4 shows the combination display apparatus presenting the same imagery on both the first and second displays during the third mode of operation, it should be appreciated that each display may present different video imagery. For example, each display may show programming from different television channels. As another example, each display may present video imagery from a different video source, such as for example, a DVD movie presented on the first display, and an Internet browser on the second display.

Furthermore, the larger second display may be used as a primary viewing display and the first display may be used for viewing of secondary content, or vice versa. For example, the second display may present a television program and the first display may present an electronic program guide. As another example the second display may present a sporting event and the first display may present a sports statistics website, such as for example a fantasy sports website, so that a viewer may watch a sporting event and keep track of relevant statistics simultaneously. In some embodiments each of the displays may include picture in picture presentation so that video imagery from multiple video sources may be presented on each display.

The above examples are meant to be non-limiting. It should be appreciated that a variety of video content from different sources may be presented on either of the displays. Further, in some embodiments the first and second displays may differ in size. For example, the first display and the second display may have the same video screen size. Alternatively, in some embodiments the first display may have a larger presentation size than the second display.

Figure 5:
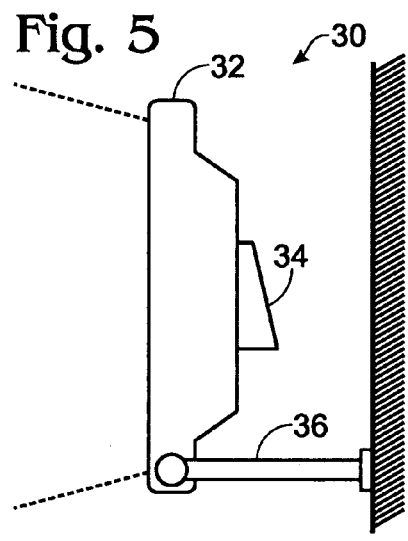
FIG. 5 shows another exemplary embodiment of the combination display apparatus operating in a direct-view mode and having a first orientation.
Figure 6:
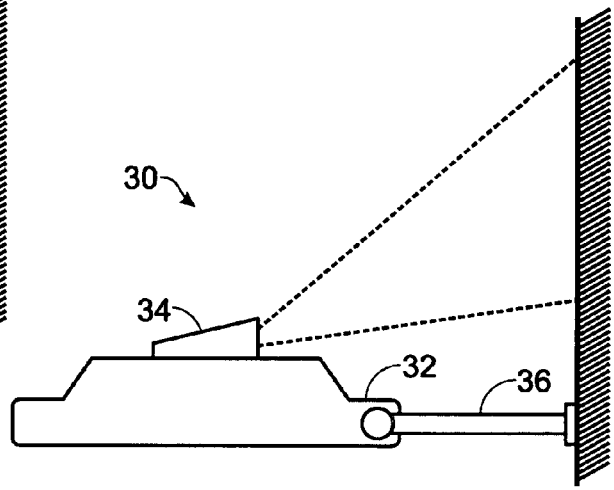
FIG. 6 shows the combination display apparatus of FIG. 4 operating in a projection mode and having a second orientation.

FIGS. 5 and 6 somewhat schematically show another exemplary embodiment of a combination display apparatus capable of being mounted to a wall and being rotated to switch between display modes. Combination display apparatus 30 includes direct-view display 32 and front projector 34 disposed on the rear surface of the combination display apparatus. Combination display apparatus 30 may be mounted to a wall via mounting bracket 36. The mounting bracket may include a combination display apparatus rotation mechanism, for example a hinge assembly. The hinge assembly may enable the combination display apparatus to rotate from a first orientation where the direct-view display is substantially vertical to a second orientation where the direct-view display is angled so as to facilitate projection behind the display. Switching between the first and second orientation may act as a trigger for operating in a first mode and a second mode. It should be understood that mounting bracket 36 is schematically represented. The mounting bracket may take a variety of different forms to accommodate display systems having different weights. For example, a parallelogram linkage may be used to support a relatively heavy display system.

FIG. 5 shows combination display apparatus 30 operating in a first mode presenting video imagery on direct-view display 32. The combination display apparatus may be orientated such that the direct-view display may be substantially vertical. Further, the configuration of the combination display apparatus enables the front projector to be concealed from view during operation in the first mode. By concealing the front projector from view when not being used, the combination display apparatus may provide an efficient use of space while having a clean exterior look.

FIG. 6 shows combination display apparatus 30 operating in a second mode presenting video imagery projected by front projector 34. In the second mode the combination display apparatus may be orientated such that the direct-view display may be substantially horizontal. Front projector 34 may include a short throw lens to project a suitably large image onto the adjacent wall while being in close proximity to the wall.

Note that in some embodiments the rotation of the combination display apparatus between the first and the second orientation may be performed manually. Additionally, in some embodiments the combination display apparatus may be rotated via a motor (not shown) or similar mechanism.

The combination display apparatus provides versatile presentation of video imagery through two different modes of operation to accommodate an audience's desired viewing experience. Furthermore, since the combination display apparatus is mounted to the wall, the apparatus does not take up floor space allowing for more flexibility when arranging a room's floor plan. In addition, as discussed above, since the direct-view display and the front projector share video controller hardware enclosed in the housing of the combination display apparatus, external connections between the different components may be eliminated to further provide a sleek look and smaller apparatus footprint.

In the illustrated embodiment, wall mount 36 is pivotally coupled to a bottom of direct-view display 32. This is not required. In some embodiments, the wall mount can be coupled to a middle portion of the direct-view display (e.g., as shown in FIGS. 7 and 8), thus allowing the direct-view display to remain closer to the mounting surface when operating in the projection mode, and at the same time exerting less torque on the mounting bracket.

FIGS. 7 and 8 show another exemplary embodiment of a combination display apparatus capable of standing alone on a surface and being rotated to switch between display modes.

Combination display apparatus 40 includes direct-view display 42 and front projector 44 disposed on the rear surface of the combination display apparatus. Combination display apparatus 40 may be supported by base 46. The base may include a combination display apparatus rotation mechanism, for example a hinge assembly. The hinge assembly may enable the combination display apparatus to rotate from a first orientation where the direct-view display is substantially vertical to a second orientation where the direct-view display is angled so as to facilitate projection behind the display. Switching between the first and second orientation may act as a trigger for operating in a first mode and a second mode.

FIG. 7 shows combination display apparatus 40 operating in a first mode presenting video imagery on direct-view display 42. The combination display apparatus may be orientated such that the direct-view display may be substantially vertical. Further, the configuration of the combination display apparatus enables the front projector to be concealed from the view of an audience watching the combination display apparatus during operation in the first mode.

FIG. 8 shows combination display apparatus 40 operating in a second mode presenting video imagery projected by front projector 44. In the second mode the combination display apparatus may be orientated such that the direct-view display may be substantially horizontal.

Note that in some embodiments the rotation of the combination display apparatus between the first and the second orientation may be performed manually. Additionally, in some embodiments the combination display apparatus may be rotated via a motor (not shown).

The combination display apparatus of FIGS. 7 and 8 provides versatile presentation of video imagery through two different modes of operation to accommodate an audience's desired viewing experience. Furthermore, since the combination display apparatus is free standing it may be placed on various different surfaces irrespective of the amount of wall space available. Additionally, in the second mode of operation the scale of projected imagery may be dictated by the position of the combination display relative to a projection screen. Namely, the combination display apparatus may be moved further away from a projection screen to increase the scale of projected imagery or moved closer to a projection screen to decrease the scale of projected imagery. Once a desired projection length is established, video projection parameters (e.g. keystoning) may be adjusted to minimize distortion.

FIGS. 9 and 10 show embodiments of a combination display apparatus configured such that a front projection device may be removably coupled to the combination display apparatus. In these embodiments, the modular design of the combination display apparatus allows for the apparatus to function strictly as a direct-view display when the front projection device is not connected. However, when the front projection device is connected the modular combination display apparatus may present video imagery on at least one of the direct-view display and the front projection device.

The video processing and controller hardware may optionally be incorporated into the modular combination display apparatus and configured to selectively direct a video output signal to the front projector device when it is connected to the combination display apparatus. This configuration may reduce the amount of hardware in the front projection device. Additionally, compared to a stand alone direct-view display device and a stand alone front projection device, the combination display apparatus may allocate processing and control hardware resources to both of the display which may reduce redundant hardware in the system. The hardware reduction further may result in reduced cost, reduced size and reduced manufacturing/production time.

In some embodiments, the video processing hardware can be incorporated into the direct-view display. In such embodiments, the video processing hardware can be used to operate the modular projector when it is operably coupled to the direct-view display. When not coupled to the direct-view display, the modular projector can be used with another video source.

FIG. 9 schematically shows modular combination display apparatus 50. Modular combination display apparatus 50 includes direct-view display 52. Furthermore, modular combination display apparatus 50 may be configured to receive front projection device 54 via mounting assembly 58. Specifically, front projection device 54 may include connectors 56 which may interlock with mounting assembly 58 to couple front projection device 54 to modular combination display apparatus 50. The front projection device connectors may interlock with the mounting assembly of the combination display apparatus in various ways.

For example, the front projector may slide on the surface of the combination display apparatus to the point where corresponding hooks may interlock to retain the front projection device. As another example, the front projection device may be screwed on to the combination display apparatus. The front projection display device additionally or alternatively may be coupled to the combination display apparatus via straps, clips, magnets or another suitable attachment mechanism.

In the illustrated embodiment, the front projection device is mounted on the top surface of the combination display apparatus behind the direct-view display. This configuration allows for the rear surface of the combination display apparatus to be flat, enabling the apparatus to be mounted directly to a wall. In this example, due to the close proximity to the wall, the front projection device may include a wide angle short throw lens in order to project onto the wall with limited distortion. Additionally, the configuration may allow for the front projection device to be concealed from view by the direct view device when mounted on the combination display apparatus.

The front projection device may electronically communicate with the processing and control hardware of the modular combination display apparatus via a video connector. For example, the combination display apparatus may include an output jack and the front projection device may include an input jack. The video connector may plug into each of the jacks to direct a video output signal from the video controller to be projected by the front projection device. In some embodiments, the video connector may be integrated into the mounting assembly such that coupling the front projection device to the combination display apparatus also results in electronic communication.

As discussed above, the video controller may include a display controller to selectively direct a processed video output signal to at least one of the direct-view display and front projection device. In some embodiments, the display controller may include a detection device to detect whether or not the front projection device is connected to the modular combination display apparatus. The display controller may direct a video output signal to the front projection device based on an indication from the detection device.

FIG. 10 schematically shows modular combination display apparatus 60. Modular combination display apparatus 60 operates in the same fashion as modular combination display apparatus 50 as described above. In particular, modular combination display apparatus 60 includes direct-view display 62. Furthermore, modular combination display apparatus 60 may be configured to receive front projection device 64 via mounting assembly 68. Specifically, front projection device 64 may include connectors 66 which may interlock with mounting assembly 68 to couple front projection device 64 to modular combination display apparatus 60.

Note that in the illustrated embodiment the front projection device is mounted on the rear surface of the combination display apparatus behind the direct-view display. This configuration may be implemented in a modular combination display apparatus that may be positioned away from a wall surface. For example, the configuration may be implemented in a free standing combination display apparatus. This configuration may further enable the size of projection to be adjusted respective to placement of the modular combination display apparatus. Namely, the modular combination display apparatus may be moved further away from a projection screen to increase the scale of projected imagery or moved closer to a projection screen to decrease the scale of projected imagery. Once a desired projection length is established, video projection parameters (e.g. keystoning) may be adjusted to minimize distortion.

The front projection device may be removed and stored when not in use, leaving the combination display apparatus with a sleeker look. As another example, the modular design may allow consumers to purchase the combination display apparatus without the front projection device in order to reduce cost. Then as their budget allows, the consumer may purchase the front projection device to add to the combination display apparatus and since the hardware is already embedded, compatibility is not an issue. Accordingly, the modular design of the combination display apparatus may provide versatility and ease of use in operation.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A combination display, comprising:
   an imaging subsystem adapted to output imaging signals including information useable to present a display image;
   a direct-view screen assembly adapted to receive imaging signals from the imaging subsystem and to begin presenting a direct-view display image based on the imaging signals when the combination display is moved to a first orientation; and
   a projection assembly adapted to receive imaging signals from the imaging subsystem and to begin presenting a projected display image based on the imaging signals when the combination display is moved to a second orientation.

2. The combination display of claim 1, where the first orientation positions the direct-view screen assembly in a substantially vertical plane.

3. The combination display of claim 1, where the second orientation positions the direct-view screen assembly in a substantially horizontal plane.

4. The combination display of claim 1, where the projection assembly includes a short throw lens.

5. The combination display of claim 1, wherein the combination display moves from the first orientation to the second orientation via rotation of the combination display.

6. A modular display assembly comprising: a direct-view display screen disposed on a front face of the modular display assembly; a front projection device removably mountable to a face of the modular display assembly; a video processing system for generating video imagery to be selectively displayed by at least one of the direct-view display screen and the front projection device; and a display controller to selectively direct the generated video imagery to be displayed by at least one of the front projection device and the direct-view display screen when the front projection device is coupled to the modular display assembly.

7. The modular display assembly of claim 6, wherein the display controller directs the generated video imagery to the direct-view display screen when the front projection device is not coupled to the modular display assembly.

8. The modular display assembly of claim 6, wherein the front projection device mounts to a top surface of the modular display assembly.

9. The modular display assembly of claim 6, wherein the front projection device mounts to a rear surface of the modular display assembly.

10. The modular display assembly of claim 6, wherein the display controller directs the same generated video imagery to both the direct-view display screen and the front projection device when the front projection device is mounted to the modular display assembly.

11. The modular display assembly of claim 6, wherein the display controller directs a first type of generated video imagery to the direct-view display screen and directs a second type of generated video imagery different than the first type of generated video imagery to the front projection device when the front projection device is mounted to the modular display assembly.

* * * * *